United States Patent [19]

Birk

[11] Patent Number: 5,278,927
[45] Date of Patent: Jan. 11, 1994

[54] EFFICIENT SINGLE-HOP INTERCONNECTION NETWORK EMPLOYING MERGED SHARED DIRECTIONAL MULTICHANNELS

[75] Inventor: Yitzhak Birk, Hod-Hasharon, Israel

[73] Assignee: International Business Machines Corporation, Armonk, N.Y.

[21] Appl. No.: 888,575

[22] Filed: May 26, 1992

[51] Int. Cl.$^5$ .............................. G02B 6/00; G02B 6/36
[52] U.S. Cl. ...................................... 385/46; 359/115
[58] Field of Search .................. 385/24, 46, 39, 42; 359/115, 118, 127, 138, 139, 143

[56] References Cited

U.S. PATENT DOCUMENTS

| | | | |
|---|---|---|---|
| 4,458,187 | 7/1984 | Heiman | 318/490 |
| 4,511,208 | 4/1985 | Ozeki et al. | 350/96.16 |
| 4,543,666 | 9/1985 | Witte et al. | 455/612 |
| 4,551,812 | 11/1985 | Gurr et al. | 364/492 |
| 4,708,424 | 11/1987 | Marhic | 350/96.16 |
| 4,914,648 | 4/1990 | Acampora et al. | 370/3 |
| 5,146,514 | 9/1992 | Birk | 385/24 |

OTHER PUBLICATIONS

On Optical Interconnection of Stations . . . by M. T. Busche et al.; Isita 1990; pp. 967–970.
Bus–Oriented Interconnection Topologies . . . by Y. Birk et al.; IEEE 1988; pp. 558–567.
On the Uniform-Traffic Capacity . . . by Y. Birk et al.; IBM Research Report 1990; pp. 1–13.

*Primary Examiner*—Akm E. Ullah
*Attorney, Agent, or Firm*—Baker, Maxham, Jester & Meador

[57] ABSTRACT

A system for the scheduled transmission of signals from source stations to destination stations in a passive, static, Single-Hop Interconnection (SHI) employing a plurality of Shared Directional Multichannels (SDMs) in a power-efficient and cost-effective manner. The system provides a practical implementation of any SHI built from a plurality of smaller SDMs whose salient feature is a significant degree of parallelism at low hardware cost while retaining the simplicity and reliability of a passive interconnection. The system is a scheme for wiring a SHI to retain the useful features of a SDM design for connecting (m) Source Stations each having (a) outputs to (n) Destination Stations each having one input such that, for m=n, the power split losses are reduced to a provably optimal value of (2n/a) and component count reduced to anlog$_2$(n/a), which is optimal for the optimal power split constraint. A SHI for any number of source and destination stations with any input and output count can be optimally constructed by the method of this invention. The passive efficient SHI of this invention outperforms the conventional passive bus-oriented SHI in channel concurrency with fewer components.

36 Claims, 5 Drawing Sheets

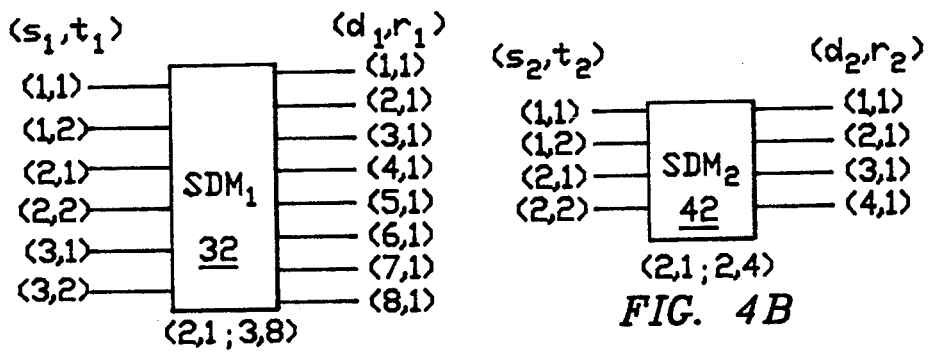
FIG. 4A
FIG. 4B
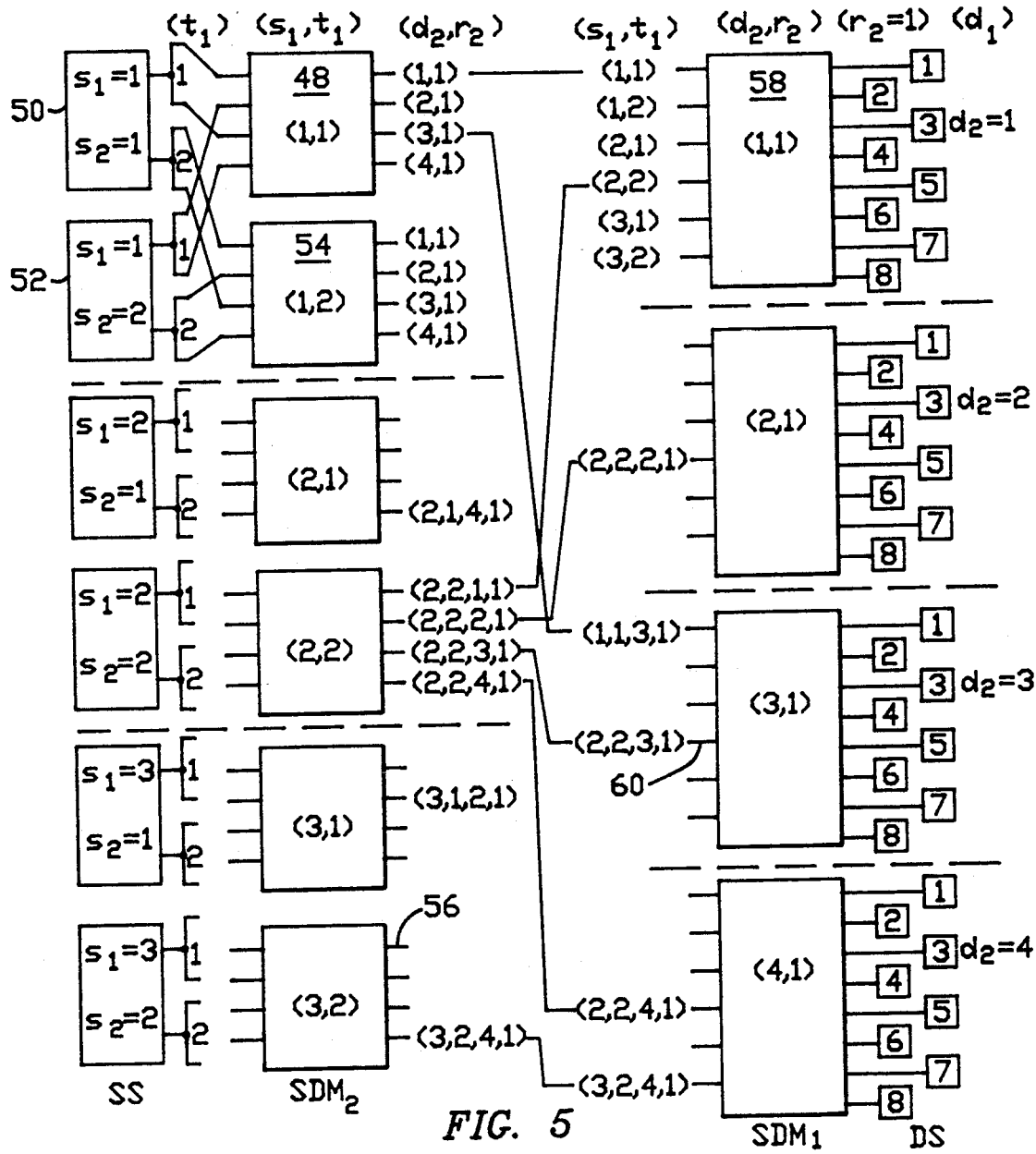
FIG. 5

EFFICIENT SINGLE-HOP INTERCONNECTION NETWORK EMPLOYING MERGED SHARED DIRECTIONAL MULTICHANNELS

CROSS-REFERENCES TO RELATED APPLICATIONS

This invention is related to the invention disclosed in patent application Ser. No. 07/769,988 entitled "Efficient Single-Hop Directional Multichannel System", filed on Sep. 30, 1991, issued as U.S. Pat. No. 5,146,514 on Sep. 8, 1992, and included herein in its entirety by this reference.

BACKGROUND OF THE INVENTION

1. Field of the Invention

This invention relates to Single-Hop Interconnection (SHI) multichannel networks in general and, more specifically, to a SHI network signal transmission procedure for composing larger SHI networks from a plurality of smaller Shared Directional Multichannels (SDMs) while maintaining or improving wiring efficiency and concurrency.

2. Description of the Related Art

The evolution of modern data communications networks has steadily increased the demand for networks offering high data transmission speeds and high levels of data parallelism or channel concurrency. Data transmission rates are limited by the physical technology composing the network interconnection linkages and by the station transmission and reception capacities. Channel concurrency is limited by the requirement that multiple message signal transmissions remain distinguishable within the network when routed to the appropriate destinations. With standard bus-oriented network architectures, the number of concurrent message signals is less than or equal to the number of buses.

The art is replete with bus-oriented SHI techniques for improving channel concurrency within a communication network. Such techniques are not limited to any particular physical communication technology. Recent improvements in fiber optic transmission technology and the invention of the optical star coupler have given rise to an explosive growth of optical network applications. The optical data transmission analogy is favored because of the very high data transmission rates possible at optical frequencies. Unfortunately, this optical bandwidth does little by itself to improve channel concurrency in switched networks. Without circuit components capable of optical switching speeds or wavelength-selective components capable of exploiting multiple optical channels, concurrency limitations continue to be an obtrusive handicap for optical data transmission networks.

Alternate proposals for overcoming these optical switching limitations suggest using non-bus-oriented SHI networks, including those employing the SDM, such as those discussed by Matthew T. Busche, et al, "On Optical Interconnection of Stations Having Multiple Transmitters and Receivers", 1990 International Symposium on Information Theory and its Applications (ISITA '90), Hawaii, U.S.A., Nov. 27-30, 1990, Session 63-3, pp. 967-970. See also Y. Birk, et al, "Bus-Oriented Interconnection Topologies for Single-Hop Communications Among Multi-Transceiver Stations", IEEE Infocon '88, pp. 558-567, IEEE Computer Society Press, 1988. For an early discussion of non-bus-oriented SHIs, see Y. Birk, "Concurrent Communication Among Multi-Transceiver Stations Over Shared Media", PhD Dissertation, Stanford University, December 1986.

A SDM consists of a set of inputs, a set of outputs, and a specification of the subset of outputs reachable from each input. A SDM is used to form a SHI by connecting a transmitter to each SDM input and a receiver to each SDM output. When a transmitter transmits a message, the message is heard by all receivers reachable from it. A message is received successfully by a receiver if and only if (a) that receiver is the intended recipient, (b) that receiver is reachable from the transmitter, and (c) that receiver hears no other "colliding" message signal at the same time.

It has been shown in theory how a SDM can be used to construct passive, static, SHIs between a set of Source Stations (SSs), each SS with one or more transmitter outputs, and a set of Destination Stations (DSs), each DS having one or more receiver inputs; such a SDM permits a large number of concurrent, non-interfering message signal transmissions if every SS has at least two outputs and every DS has at least two inputs (Y. Birk, et al, "On the Uniform-Traffic Capacity of Single-Hop Interconnections Employing Shared Directional Multichannels", IBM Research Report RJ7859, December, 1990, IBM Corp., Armonk, N.Y., referred to hereinafter as "Birk et al (1990)"). The terms "passive" and "static" as used herein denote that the SDM is fixed (no switches), and that there is a transmitter output in the SS and a receiver input in the DS for each (SS, DS) pair such that the latter can hear the message signal transmitted from the former without active components or repeater stations in the signal path.

The SHIs employing SDMs lend themselves to an implementation using optical fibers and directional star couplers. A directional star coupler is an element with several input fibers and several output fibers. An optical signal presented an any input is spread among all outputs but does not spread retrogressively to any of the other input fibers. The star coupler is unlike an optical switching coupler in that the optical signal at any input fiber is passively distributed equally among all output fibers.

In U.S. Pat. No. 4,708,424, Michel Marhic discloses a method for interconnecting smaller star couplers to synthesize large single-mode stars. Marhic teaches the use of 2-star fiber optic couplers having two inputs and two outputs as building blocks to form 2N-star couplers of any desired size and shows that the power spreading losses in such 2N-star couplers is substantially equal to the factor associated with the larger of either the number of inputs (in-degree) or the number of outputs (out-degree) of the star.

More precisely, when all fibers used in a star coupler are of equal cross-section, as is usually the case, the ratio of the signal power presented at an input to the power emerging from any output is equal to the maximum of the "in-degree" or the "out-degree" of the star coupler. Therefore, for a SHI of (m) SSs each having (a) transmitter outputs and (n) DSs each having (b) receiver inputs, implemented by connecting each transmitter to a (1 by n/a) coupler and each receiver to a (m/b by 1) coupler, with fibers between the two coupler types, a signal must travel through a (1 by n/a) coupler followed by a (m/b by 1) coupler when traversing the SDM between transmitter and receiver. The practical problem with this scheme is that the signal power at a receiver must then be the transmitted power divided by $n^2/(ab)$, assuming $m=n$. This quadratic spreading loss limits the number of DSs and SSs that may be connected passively to no more than 15-20.

The notation known in the art for an SDM-based SHI such o as discussed above is (a,b;m,n) denoting (#outputs, #inputs; #SSs, #DSs). As used herein, an "efficient" SHI denotes an SHI with a spreading loss that is linear in $n=m$. Heuristically, any wiring of an SDM-based SHI must permit the message signal to be split (n/a) ways because each transmitter must reach (n/a) receivers. Similarly, (m/b) signals must be combined at each receiver because each receiver is connected to (m/b) transmitter outputs. Therefore, the minimal power split intuitively possible is max(n/a, m/b).

In the above-cited Birk patent, Birk teaches a system for selecting the number of and specifications for several coupling stages and a wiring method that permits the interconnection of (m) SSs each having two transmitter outputs, and (n) DSs each having one receiver input, such that the power spreading loss is no more than twice the intuitively optimal value, increasing linearly in (n) rather than quadratically. However, the above-cited Birk patent does not consider the problem of optimally connecting a set of SSs to a set of DSs where neither (a) nor (b) is unity.

In the Birk et al (1990) reference cited above, it is shown to be theoretically possible to construct a third SHI from a plurality of first and second SDMs such that the number of concurrent non-interfering signal transmissions in the third SHI is the product of the respective channel signal concurrencies in the two constituent SDMs. However, until now, there was no available practical method for constructing such a SHI in a manner that avoids quadratic growth in wiring, power spreading loss and complexity, without sacrificing this gain in message concurrency. Using the above notation, the third SHI is described as $(a_1a_2, b_1b_2; m_1m_2, n_1n_2)$ in terms of the two constituents, $(a_1,b_1;m_1,n_1)$ and $(a_2,b_2;m_2,n_2)$.

For instance, Birk et al (1990) show how to choose the connections and schedule message transmissions such that, for (n) SSs, each with (a) transmitters, and (n) DSs, each with (b) receivers, the SHI (a,b;n,n) can sustain roughly $(\log_2 n)^{a+b-2}$ concurrent non-interfering signal transmissions for a uniform traffic pattern. While the performance reward for increasing the number of transmitters and receivers is substantial, the natural manner of directly configuring the wiring according to the station connection list requires numbers of wires and directional couplers and (for fiber optic implementations) transmission power that grow quadratically (in proportion to $n^2$) with increasing numbers of stations.

With fiber-optic implementations, this quadratic spreading loss problem requires either active repeaters or a severe restriction on the maximum number of stations to 15-20 at the most. This limitation results from the above-mentioned peculiar power-spreading properties of the fiber-optic star coupler, for which the ratio of input power to output power is equal to max (in-degree, out-degree) rather than the out-degree alone.

The above-cited Birk patent teaches how, for $b=1$, a canonical SDM form can be used as a non-bus-oriented SHI offering a concurrency of $k=(\lceil \log_a n \rceil$ choose $(a-1))=(\lceil \log_a n \rceil)!/(a-1)!/(\lceil \log_a n \rceil -a+1)!$ with a power spreading loss of $(2n/a)$. Birk teaches a procedure for efficiently transmitting signals in a specific interconnection when $a=2b=2$ or $b=2a=2$. However, the more general theoretical teachings by Birk et al (1990) for composing any two given SDMs to form a larger one, until now, have not been implemented in a manner that avoids quadratic spreading losses.

There is a strongly felt need in the optical network art for such a high concurrency passive SHI suitable for efficient signal transmission with a power split loss that grows linearly instead of quadratically with (n) and a component count that is optimal under the constraint of optimal power budget. The above-cited Birk patent solves this problem for $a=1$ or $b=1$, but does not teach or suggest means for efficient signal transmission through a SHI of general size without encountering quadratic increases in spreading loss and component count. The associated problems and unresolved deficiencies are clearly felt in the art and are solved by this invention in the manner described below.

SUMMARY OF THE INVENTION

This invention provides a method for composing any two given Shared Directional Multichannel (SDM) designs to form a larger Single-Hop Interconnection (SHI) while retaining or improving wiring efficiency and power spreading efficiency without losing channel concurrency. This invention is a general SHI that is constructed from any requisite combinations of SDMs that were used to construct smaller SHIs. This invention is effectively the practical implementation of the composition lemma proved in the above-cited Birk et al (1990) reference.

The method of this invention includes the two steps of (1) composition and (2) compaction of several efficient SDMs to form a new efficient SHI. The composition step is carried out by abutting a set of first SDMs to a set of second SDMs and connecting the links between the two sets according to an index concatenation scheme. The object of this first step is to form a multi-stage SHI having message concurrency equal to the product of the concurrencies of the two SHIs thus combined. The result of this first step may suffer a spreading loss that is also quadratically related to the losses of the component SDMs, requiring a second compaction step.

The object of the second compaction step is to optimize the spreading loss by balancing or "squaring" the star couplers within each coupling stage, and to eliminate coupling stages where possible. This procedure for optimizing power spreading loss will also optimize wiring count without degrading the channel concurrency. The directional star couplers are "squared" or balanced by making the in-degree substantially equal to the out-degree (#inputs=#outputs) in each stage, thereby balancing the cumulative fan-in and fan-out and minimizing the power spreading loss factors.

It is an advantage of the SHI system of this invention that the interconnection merger is symmetric in SS and DS as well as in the designation of first and second SDM. Thus, the first and second SDM positions may be reversed or the SS and DS positions may be reversed without affecting the usefulness of this invention. Using the notation introduced above, this means that the SHI is symmetric such that (a,b; m,n)=(b,a; n,m).

It is another advantage and feature of this invention that any permutation of the concatenated index node numbers results in no substantive change in the signal distributing performance of the resulting SHI, although the topology of such SHI may appear to be different.

It is yet another feature of this invention that the object of the second compaction step may be substantially accomplished by forcing the directional couplers in each coupling stage to be merely loosely "square" rather than absolutely square, thereby easing the difficulties inherent in any perfect balance requirement with little loss of the essential power spreading advantages.

The efficient SHI of this invention provides optimal power budget and, additionally, permits a signal to follow a unique path from each SS transmitter output to each DS receiver input, thereby avoiding any possibility of self-interference. The number of coupling stages traversed by a message signal is of no concern with the system of this invention because all couplers are passive elements and introduce no signal delay. This invention provides an unlimited range of passive, static SHIs employing a SDM in a power-efficient and cost-effective manner. For the first time, such networks can be practically implemented with a high degree of channel concurrency at low cost while retaining the simplicity and reliability of a passive interconnection.

A less obvious economic advantage of this invention is that it also optimizes the passive component count (couplers and fiber segments). A typical efficient SHI requires running $(a+b)$ signal lines from every station to a wiring closet, in which the actual SHI resides. Alternatively, $\max(a,b)$ signal lines are sufficient provided that directional couplers are placed at each end.

The foregoing together with other objects, features and advantages of this invention will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIG. 4, comprising 4A and 4B, shows the SDMs from FIGS. 2 and 3 with the concatenated indices required for the composition step of the method of this invention;

FIG. 5 shows a new (4,1;6,32) SHI comprising pluralities of the two SDMs from FIG. 4 after the composition step of the method of this invention;

DETAILED DESCRIPTION OF THE PREFERRED EMBODIMENTS

Figure 1:
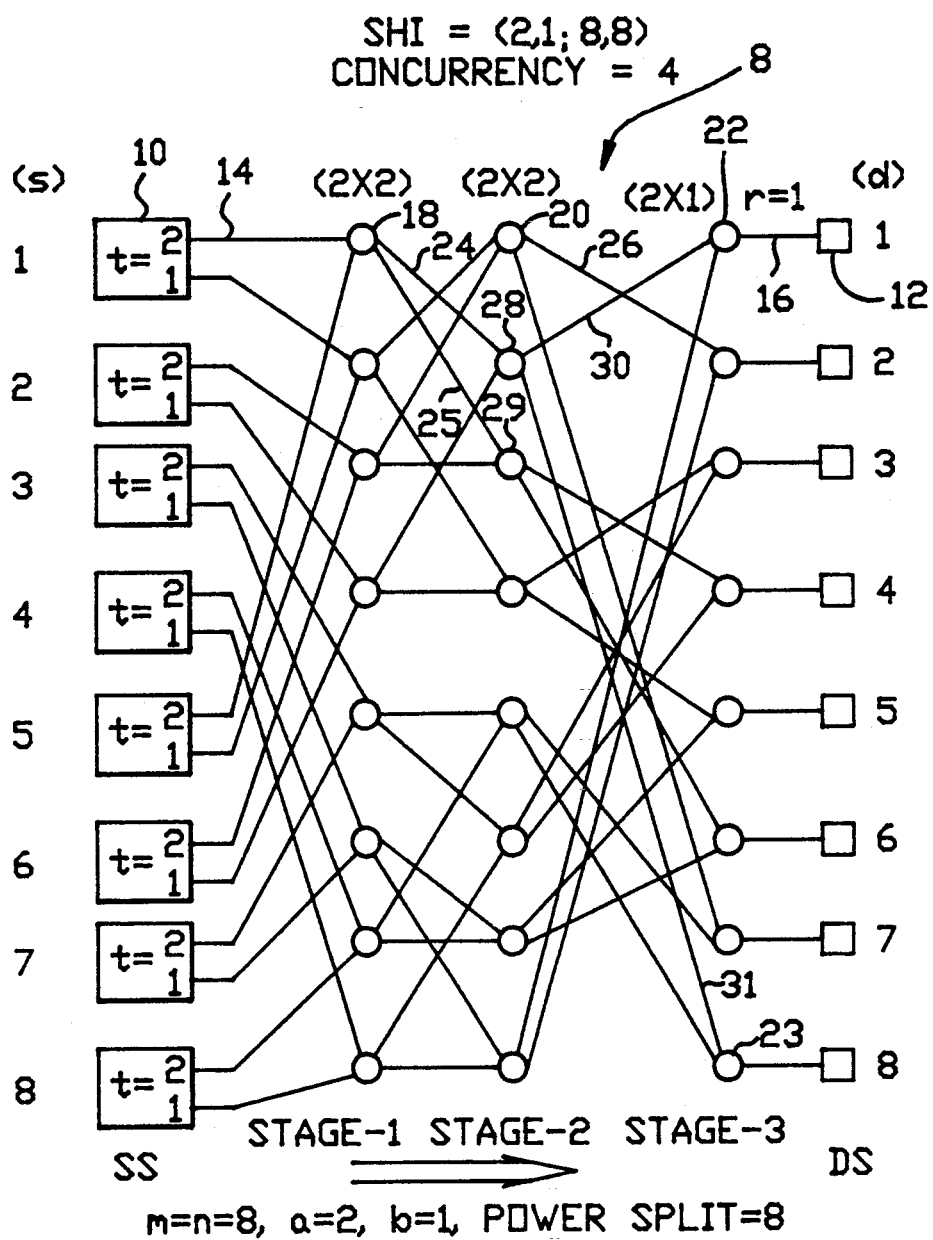
FIG. 1 shows an exemplary embodiment of an efficient (2,1;8,8) Single-Hop Interconnection (SHI) using a three-stage Shared Directional Multichannel (SDM)

The method of this invention is primarily an efficient implementation of the composition lemma proven in the Birk et al reference cited above. The following symbol definitions and notation conventions are established.

Notation and Symbol Definitions

The following notation and symbol definitions are generally consistent with the above-cited references and are repeated here for convenience in interpreting the following disclosure and drawings.

Consider a set SS of (m) source stations, $SS=\{s_1, \ldots, s_m\}$, communicating with a set DS of (n) destination stations, $DS=\{d_1, \ldots, d_n\}$. Each station in SS has (a) transmitter outputs that are indexed by a set $T=\{1, \ldots, a\}$ and each station in DS has (b) receiver inputs, indexed by a set $R=\{1, \ldots, b\}$.

For each pair of stations, (s) in SS and (d) in DS, exactly one transmitter output of (s) is connected to exactly one receiver input of (d). The index of that one transmitter output is denoted by $W_1(s,d)$, which is an element of set T, and the index of that one receiver input is denoted by $W_2(s,d)$, which is an element of set R. With this convention, a (m by n) matrix, W, indexed by SS and DS, can be written with entries $W(s,d)=(W_1(s,d),W_2(s,d))$. Matrix W is called the wiring matrix in the above-cited Birk et al (1990) reference.

Within this W interconnection, message signals are transmitted according to a predetermined schedule in discrete time slots and each message signal is exactly one time slot in duration. The predetermined transmission schedule is expressed as an (m by n) matrix, X, also indexed by SS and DS with entries X(s,d) that represent time-slot values. A schedule X is compatible with a wiring W if and only if, for all pairs (s,d) in SS and DS, (s) communicates successfully with (d) at time X(s,d). Successful communication means that a signal from some output of (s) arrives at some input of (d) and no other signals arrive at the same input during the subject time slot. The above-cited Birk et al (1990) reference defines the compatibility requirements in formal terms.

The size of the Single-Hop Interconnection described above can be specified formally as (a,b;m,n), and an (m by n) wiring matrix W would complete its unambiguous specification. The specification of W also determines one or more specifications of the scheduling matrix X. Given an (a,b;m,n) SHI, an (b,a;n,m) SHI can be easily constructed and operated with the same degree of concurrency by simply transposing both the wiring matrix W and the scheduling matrix X.

The Efficient SHI Using a SDM

A power-efficient implementation of a conventional bus-oriented SHI of (n) stations (1,1;n,n) requires $(n/2)\log_2 n$ couplers of size (2 by 2), and permits a single concurrent message signal transmission (channel concurrency $=1$). Thus, the ratio of number of couplers per station to message concurrency is $0.5\log_2 n$ in a bus-oriented SHI.

For $m=n$ and $a=b$, the efficient non-bus-oriented SHI of this invention requires at most $n\log_2(n/a)$ couplers of size (2 by 2). The channel concurrency is approximately $(\log_2 n)^{2a-2}$. Thus, the ratio of couplers per station to channel concurrency is $(a\log_2(n/a))/(\log_2 n)^{2a-2}$, which is better than the conventional bus-oriented network. Thus, the efficient SHI of this invention, for a uniform or determinative non-uniform signal traffic pattern, outperforms the conventional bus-oriented SHI in both channel concurrency and component cost to performance ratio.

A Shared Directional Multichannel (SDM) consists of a set of inputs and a set of outputs to which transmitters and receivers may be respectively connected. A signal placed at any given SDM input reaches a determinant subset of the SDM outputs. A channel is specified by the SDM output subsets reached by signals presented at the different SDM inputs.

Conventional bus-oriented interconnections are SDMs but, in general, a SDM is not limited to bus-oriented constraints because the SDM output subsets that can hear two disjoint inputs need be neither identical nor disjoint.

As pointed out in the above-cited Birk et al (1990) reference, the channel specified within a SDM is governed by two rules. First, a message signal transmitted into any given input of the channel reaches all outputs connected to it. Secondly, a message signal is received successfully at a channel output if and only if the signal is addressed to that particular output and no other signals reach the same output at the same time.

FIG. 1 illustrates a typical efficient SHI formed by interposing a SDM 8 between a set of eight SSs and eight DSs. The SHI in FIG. 1 is a (2,1;8,8) interconnection. The eight SSs are exemplified by the SS 10 and the eight DSs are exemplified by the DS 12. Each SS is indexed with an index (s) ranging from 1 to 8. Each DS is similarly indexed with an index (d) ranging from 1 to 8. SS 10 contains two transmitter outputs exemplified by the output 14. DS 12 contains a single receiver input 16. The two transmitter outputs from each SS are indexed with (t) ranging from 1 to 2. Each DS input is indexed with $(r)=1$.

The SDM 8 consists of three coupling stages interconnected with a plurality of passive signal connections. Coupling stage 1 includes eight couplers, exemplified by the coupler 18, each having two inputs and two outputs. Thus, coupling stage-1 contains couplers having an in-degree of 2 and an out-degree of 2. The second coupling stage-2 also contains eight (2 by 2) couplers. The final coupling stage-3 contains eight (2 by 1) couplers, exemplified by coupler 22.

The couplers in stage-1 are connected by single links, typified by link 24, to the couplers in coupling stage-2. Coupling stage-2 is connected to coupling stage-3, also by links, typified by link 26. Finally, the output of the couplers in stage-3 are connected directly to receiver input $(r)=1$ of each DS as shown in FIG. 1.

The operation of the SHI in FIG. 1 can be appreciated with reference to the connections. For instance, a signal at output 14 is presented to one input of coupler 18. Therefrom, it is presented via link 24 from coupler 18 to coupler 28 and via link 25 to coupler 29. At coupler 28, it is presented via link 30 to coupler 22 and via link 31 to coupler 23. From coupler 22, it proceeds along a link to receiver input 16 arriving finally at DS 12. However, the same signal also simultaneously arrives at the DSs represented by index $(d)=4$, 6 and 8.

Thus, the operation necessary to transmit a signal from SS 10 to DS 12 also presents the same signal to three other DSs, thereby preventing those three DSs (4, 6 and 8) from successfully receiving messages at the same time. In fact, the only other signals that may be simultaneously transmitted through SDM 17 are signals from some SSs to one or more of DSs having index values $(d)=2$, 3, 5 or 7. Careful study of the SHI illustrated in FIG. 1 will confirm that three other SSs transmitter outputs can be simultaneously presented to three of these four remaining DSs without mutual interference. For instance, $(s,t)=(2,2)$, (3,2) and (6,2) can concurrently transmit to $(d)=2$, 3 and 5, respectively, without interference. Thus, the SHI in FIG. 1 is said to have a message concurrency value of four, which means that no more than four simultaneous message signals may be passively connected from the eight SSs to the eight DSs without interference.

Another arbitrary example of four simultaneous message signal transmissions can be seen in FIG. 1 as follows. Four signals at SS outputs designated by the concatenated index (s,t) are (1,2), (4,2), (6,1), and (7,1) are concurrently propagated through SDM 8 to the DSs designated by the index $(d)=(4)$, (3), (2), and (7). All other DS receiver input signals are useless because of multiple signal interference.

The SHI in FIG. 1 represents an "efficient" version of the SHI known in the art because of the very low power splitting loss presented by SDM 8. The power splitting loss can be computed as the product of the maximum of the in-degree or out-degree for each coupling stage and represents the cumulative power split over the signal path. For instance, the first stage presents a power split of 2 to 1, having (2 by 2) couplers. The second stage again splits the power by a factor of two. Finally, the third stage, although it has only a single output, also splits the power by a factor of two because of the unique power splitting rules for star couplers discussed above. Thus, the three stage SDM 18 provides an output power level at receiver input 16 that is equal to one-eighth of the power provided from transmitter output 14. The performance ratio for the entire SHI can be expressed as a ratio of power splitting factor divided by message concurrency. For FIG. 1, this performance ratio is equal to 2.0, which is very nearly ideal.

The several coupling stages illustrated in FIG. 1 also have a property denominated herein as "cumulative fan-in" and "cumulative fan-out". The cumulative fan-in and fan-out characteristics are different from the max(out-degree, in-degree) factors used above to determine power splitting losses. The cumulative fan-in is defined as the product of the in-degree of each coupling stage across the SDM. Similarly, the cumulative fan-out is defined as the product of the out-degree of each coupling stage across the SDM. Accordingly, in FIG. 1, the cumulative fan-in for SDM 8 is equal to 8 while the cumulative fan-out is only 4.

Figure 2:
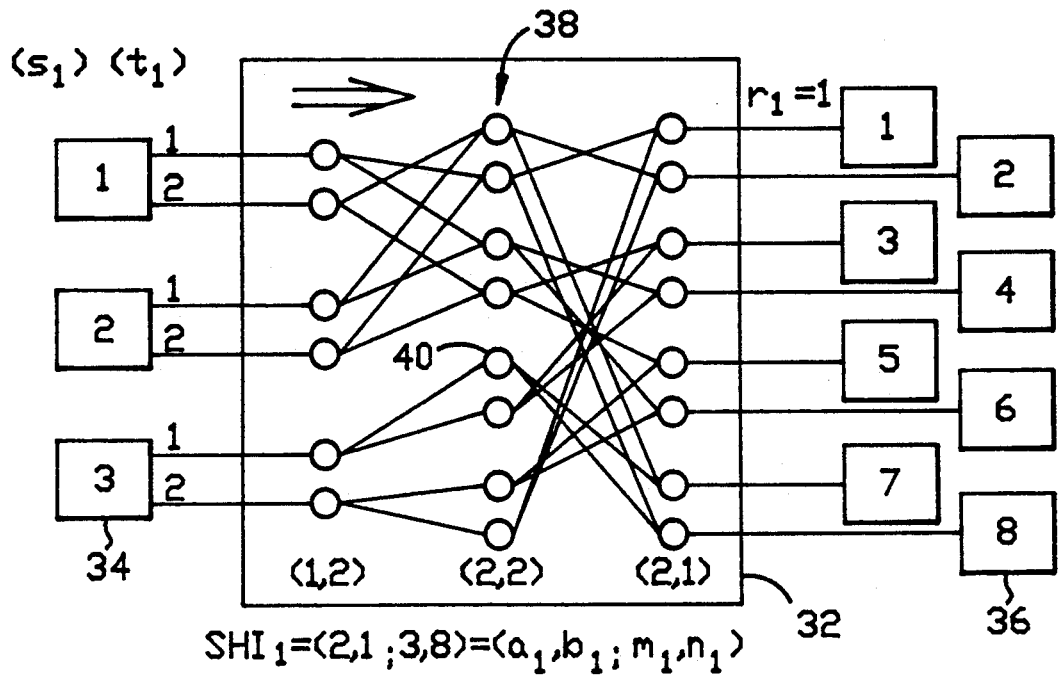
FIG. 2 shows an illustrative (2,1;3,8) SHI suitable for merger into a new SHI.
Figure 3:
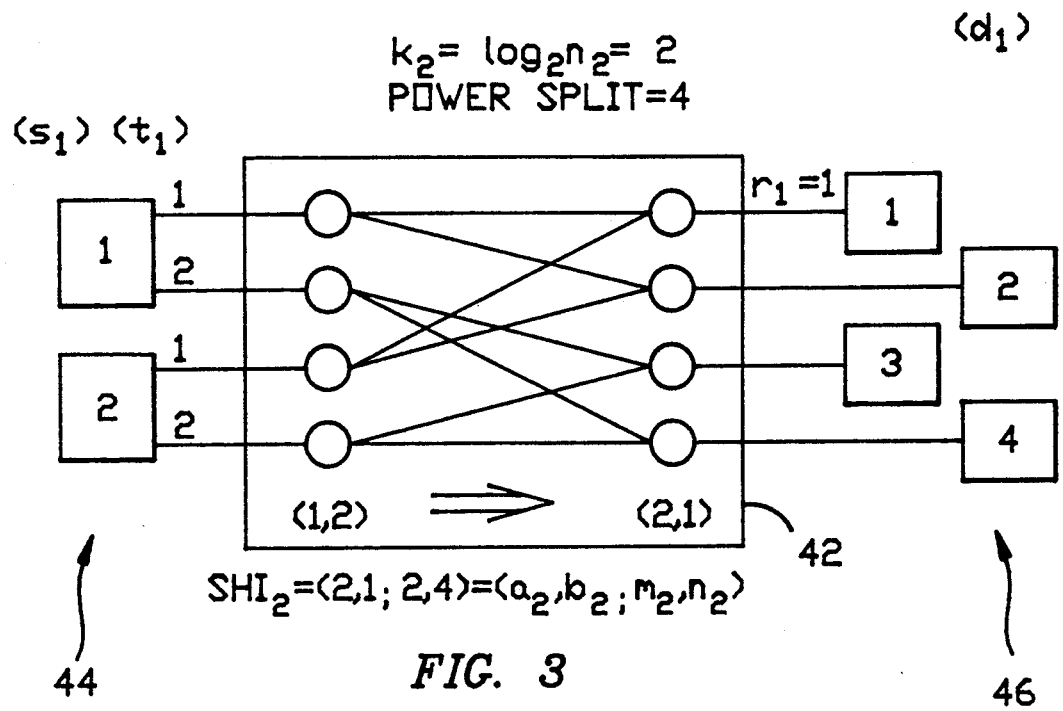
FIG. 3 shows an illustrative (2,1;2,4) SHI suitable for merger into a new SHI.

FIGS. 2 and 3 present two other typical examples of efficient SHIs. In FIG. 2, $SHI_1$ is presented having a single SDM 32 with the three coupling stages shown. $SHI_1$ connects to three SSs, typified by the SS 34. SS 34 is assigned the $(s_1)$ index value of 3. Each SS in FIG. 2 has two transmitter outputs that are indexed with $(t_1)$ ranging from 1 to 2. Similarly, there are eight DSs, typified by DS 36, indexed with $(d_1)$ ranging from 1 to 8 and DS 36 is assigned index value $(d_1)=8$.

$SHI_1$ is a (2,1; 3,8) interconnection and is implemented with SDM 32 having the three coupling stages shown to provide a power splitting loss of eight. Note that the middle coupling stage 38 contains eight (2,2) couplers but that four of those couplers in the lower half of coupling stage 38, typified by the coupler 40, are not fully utilized. This is the result of the absence of a fourth SS at the input of SDM 32. The fourth SS is not necessary to achieve the $SHI_1$ message concurrency level of three but could be added without affecting power splitting loss or message concurrency.

The $SHI_2$ in FIG. 3 can be similarly described as a combination of a SDM 42, a set of SSs 44 and a set of DSs 46. SDM 42 consists of two coupling stages and provides a power splitting loss of four.

FIG. 4, consisting of FIGS. 4A and 4B, shows SDM 32 and SDM 42, respectively, with the concatenated indices associated with the SS and DS connections shown in FIGS. 2 and 3. SDMs 32 and 42 are selected as arbitrary illustrative building blocks to demonstrate the application of the method of this invention for configuring efficient SHIs having one or more receiver inputs per destination station. In FIG. 2, the cumulative fan-in is 4 as is the cumulative fan-out. Finally, in FIG. 3, both the cumulative fan-in and fan-out are merely two.

Given two SHIs, denoted SHI$_1$ and SHI$_2$, of sizes ($a_1,b_1;m_1,n_1$) and ($a_2,b_2;m_2,n_2$), respectively, a composition lemma (Lemma 6) in the above-cited Birk et al (1990) reference teaches how to compose those two into a new, larger SHI such that the number of concurrent non-interfering transmissions in the new SHI is the product of the respective channel concurrencies in the two constituent SHIs.

The new SHI is of size (a,b;m,n), where a=$a_1$*$a_2$, b=$b_1$*$b_2$, m=$m_1$*$m_2$, and n=$n_1$*$n_2$. Stations, transmitters and receivers are indexed using a concatenation of indices from the constituent interconnections. For example, an SS is specified as $s_1s_2$, where $s_1$ ranges between 1 and $m_1$ and $s_2$ between 1 and $m_2$, yielding the requisite $m_1$*$m_2$ possibilities. Similarly, the transmitter used for transmitting from s=$s_1s_2$ to d=$d_1d_2$ is t=$t_1t_2$, where $t_1$ is the transmitter used in SHI$_1$ for transmissions from $s_1$ to $d_1$ and $t_2$ is the transmitter used in SHI$_2$ for transmissions from $s_2$ to $d_2$. Similar notation is applied for receivers.

The essence of this invention is the practical implementation of the composition lemma taught by the Birk et al (1990) reference cited above. Birk et al did not show how to design the efficient wiring of the new SHI. Given two SHIs and the composition rule, this invention teaches how to make the actual connections to provide the required paths between transmitters and receivers of the new SHI while maintaining high efficiency in terms of power split and component count. The new SHI is constructed in the two steps of (a) composition of an appropriate number of SDMs of the form used in the constituent SHIs, and (b) compaction of the coupling stages.

The Composition Step of this Invention

The above-cited Birk et al (1990) reference gives proof that it is possible to derive an interconnection SDM$_3$ with message signal concurrency $k_3$=$k_1$*$k_2$, where $k_1$ is the concurrency of SDM$_1$ and $k_2$ is the concurrency of SDM$_2$, but does not suggest how to lay it out efficiently. The composition of SDM$_3$ is carried out by abutting two sets of SDMs in the manner illustrated in FIG. 5. The first such set SDM$_2$ consists of ($m_1$*$a_1$) SDMs each identical to SDM 42. The second set of SDM$_1$ consists of ($n^2$*$b_2$) SDMs each identical to SDM 32 in FIG. 4A. Thus, a signal moves from the left of FIG. 5 through one SDM 42 and therefrom through another SDM 32 before exiting on the right side of FIG. 5.

The example in FIG. 5 shows $n^2$=4, $a_1$=2, $b_2$=1 and $m_1$=3. Thus, there are six copies of SDM 42 and four copies of SDM 44 in the new SHI$_3$ shown in FIG. 5. Using the notation discussed above, SHI$_3$=(4,1; 6,32) and includes six copies of SDM$_2$=(2,1; 2,4) and four copies of SDM$_1$=(2,1; 3,8). Note that the SHI$_3$ is also written as the product of each element of SHI1 and SHI$_2$. Thus, (2,1; 3,8) multiplied by (2,1; 2,4) is equal to (4,1; 6,32). Examination of the specification for SHI$_3$ shows that it includes six SSs and 32 DSs, each SS having four transmitter outputs and each DS having one receiver input. If the transpose (1,2; 4,2) of SHI$_2$ were instead used, the new SHI would be (2,2; 12,16), which can be constructed by the same method. Thus, this invention is not limited to SHIs having single-input DSs.

Reference is made to the above-cited Birk patent for a general treatment of the canonical efficient SHI having a single input at every DS. This canonical SHI is written (a,1; m,n) and is symmetric in that it may also be written as (1,a; n,m) as noted above. It will be readily appreciated that two such canonical SHIs, for instance, (p,1; m,n) and (1,a; e,f) can be combined by the method of this invention to provide the new efficient SHI written as (p,a; e*m, f*n). Because the non-zero positive integers p, a, e, f, m and n can be any value, the "new" SHI of this invention is of unlimited generality and may adopt any desired number of transmitter outputs and receiver inputs for any desired number of SSs and DSs without loss of channel concurrency or power and component efficiency.

For the general composition step of this invention, the nomenclature in FIGS. 2 and 3 is used. That is, SDM$_1$ (SDM 32 in FIG. 2) is equal to ($a_1,b_1$; $m_1,n_1$) and SDM$_2$ (SDM 42 in FIG. 3) is equal to ($a_2,b_2$; $m_2,n^2$). The SDM inputs and outputs are indexed in accordance with the concatenated indices discussed above and illustrated in FIGS. 4A and 4B, which are ($s_1,t_1$), ($d_1,r_1$), ($s_2,t_2$) and ($d_2,r_2$).

A SDM$_2$ interconnection has $m_2$ SSs, yet the new SHI$_3$ has $m_3$=$m_1$*$m_2$ SSs. Thus, the SSs in FIG. 5 are divided into $m_1$ groups of $m_2$ SSs apiece such that the SSs in each group all have the same value of the ($s_1$) portion of their station identification index. In FIG. 5, note that the individual SS groups are set off by dashed lines and are individually indexed as ($s_1$)=1, 2 and 3.

The SDM$_2$ shown in FIG. 3 is disposed for ($a_2$) transmitter outputs from each SS, yet there are $a_3$=$a_1$*$a_2$ transmitter outputs from each SS in FIG. 5. Thus, for each group of ($m_2$) SSs in FIG. 5, there must be ($a_1$) SDM$_2$s each using ($a_2$) transmitter outputs from every SS in the SS group. Moreover, the transmitter outputs used in each such SDM$_2$ all must have the same value for the ($t_1$) portion of their transmitter output number. This can be appreciated by referring to FIG. 5 and noting the SDM 48 in the first SS group has a ($s_1$) index value of one. Because the value of the ($t_1$) transmitter output index assigned to SDM 48 is also one, only those outputs from SS 50 and SS 52 that have a $t_1$ index value of 1 may be connected to SDM 48. Because SS 50 has two such outputs, as does SS 52, the four inputs to SDM 48 are completely filled by the corresponding transmitter outputs.

Immediately below SDM 48, SDM 54 is positioned with a concatenated ($s_1,t_1$) index of (1,2), thereby being limited to SS transmitter outputs having an index ($t_1$) value of 2. Although not shown, the remainder of the connections on the left side of FIG. 5 are similarly disposed under the composition step of this method. In summary, there is a total of ($m_1$*$a_1$) SDM$_2$s and each can be described by the SS group number and transmitter output group number in each SS. This is simply the concatenated index ($s_1,t_1$) shown for each SDM$_2$ in FIG. 5.

The next step is to assign an index to the output of each SDM$_2$ in FIG. 5. The index ($d_2,r_2$) presented in FIG. 4B represents the concatenated index of the DS receiver input that would be connected in a stand-alone SHI$_2$. However, in FIG. 5, receiver inputs are not connected to the outputs of SDM$_2$. Nevertheless, the output index can be assigned according to such a connection index. Because each output can be uniquely indexed by a combination of the $SDM_2$ identifier $(s_1,t_1)$ and the output identifier $(d_2,r_2)$ from FIG. 4B, it is obvious that each $SDM_2$ output in FIG. 5, exemplified by output 56, may be indexed according to the unique concatenation $(s_1,t_1,d_2,r_2)$. The first two indices in this concatenation represent the actual partial SS and transmitter output numbers of the $SDM_2$ inputs that can reach the respective $SDM_2$ output.

Turning to the right-hand (destination) side of FIG. 5, there are $(m_2*b_2)$ $SDM_1$s. By analogy with the foregoing construction of $SDM_2$s to the left, the DSs are grouped into $(n^2)$ groups of $(n_1)$ DSs and $(b_2)$ $SDM_1$s are assigned to each group such that the DSs in each DS group all have identical values of $(d_2)$ and the receiver inputs used in $SDM_1$ all have identical values of $(r_2)$. This is an important step which is easy to follow in FIG. 5 because the values of $(r_2)$ is unity. Again, for example, the SDM 58 is connected only to DSs having a index $(d_2)$ value of unity and a receiver input index $(r_2)$ value of unity. Thus, SDM 58 is labelled with the concatenated index $(d_2,r_2)$ of $(1,1)$ as shown.

An individual input to any $SDM_1$, typified by SDM 58, can be identified by group number, copy number and the SS and transmitter output number that would have been connected to it in a stand-alone $SHI1$, such as illustrated in FIG. 4A. These input labels are the concatenated indices $(s_1,t_1)$ as shown in FIG. 4A. Thus, any input for any of the $SDM_1$s shown in FIG. 5 can be uniquely labelled by the concatenation $(s_1,t_1,d_2,r_2)$ as typified by the input 60 for which the concatenated label is $(2,2,3,1)$. The last pair of indices truly represents the partial DS and receiver input indices of all $SDM_1$ outputs that can be reached from the respective $SDM_1$ input.

Because the parameters used to label the outputs of $SDM_2$ are identical to those used to label the inputs of $SDM_1$, and because in each case all possible combinations of the same parameters are used, it is now possible to connect each $SDM_2$ output to a $SDM_1$ input having an identical concatenated index label. Finally, note that the SSs and DSs in FIG. 5 are already connected to the appropriate $SDM_2$ inputs and $SDM_1$ outputs. Thus, this completes the composition step of this invention.

Figure 6:
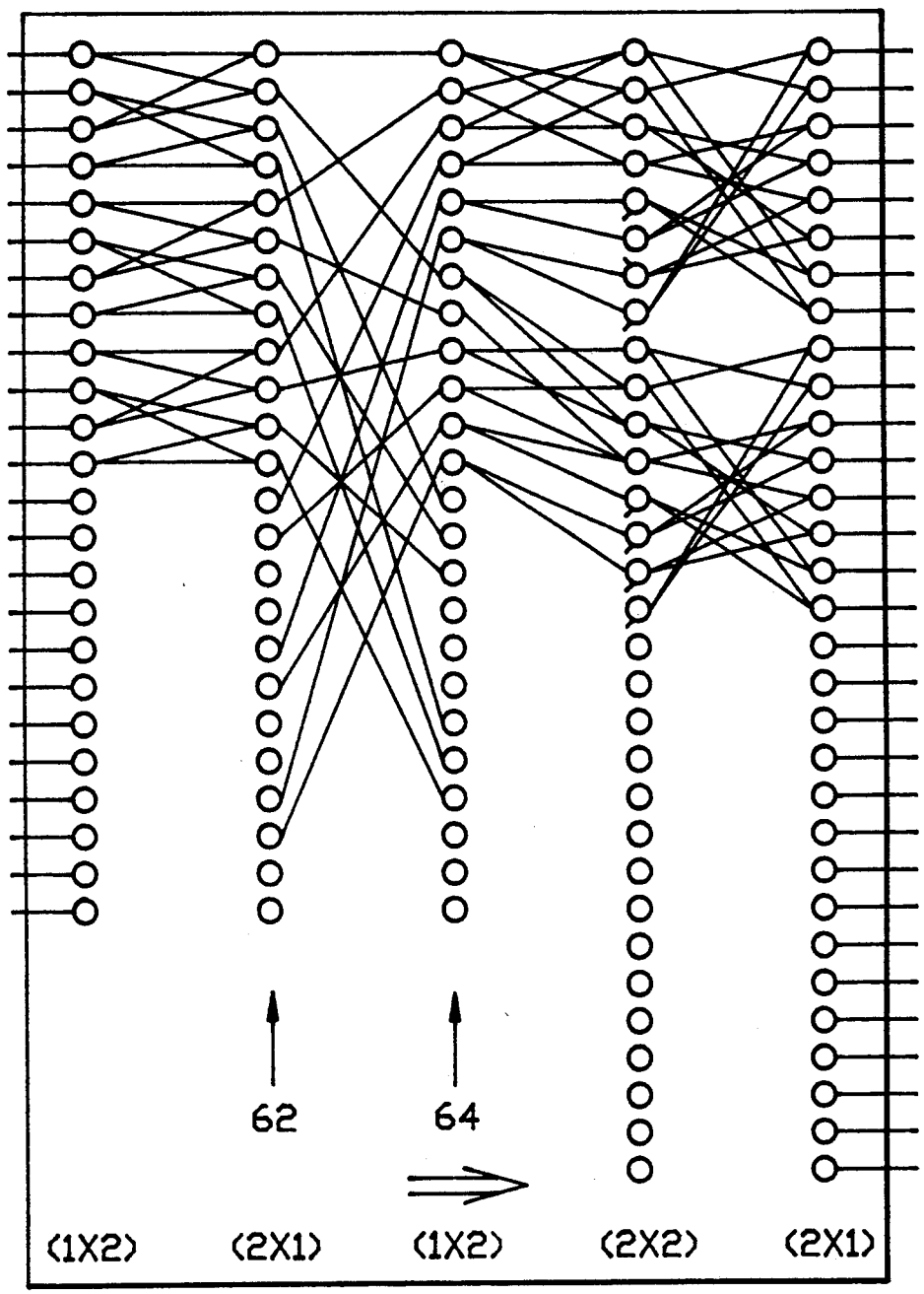
FIG. 6 shows the five coupling stages of the (4,1;6,32) SDM from the SHI of FIG. 5 before the compaction step of the method of this invention.

FIG. 6 shows the new $SDM_3$ resulting from the interconnection rules discussed above in connection with FIG. 5. For simplicity, only the connections related to the upper half of the couplers are shown.

The above connection rules can be shown to faithfully represent the wiring matrix W specified in the above-cited Birk et al (1990) reference. Without loss of generality, consider SS number $s_1*s_2*$ and DS number $d_1*d_2*$. From the above-cited Birk et al (1990) reference, it follows that the transmitter output and receiver input used for connecting those two should be $t_1*t_2*$ and $r_1*r_2*$, respectively, where $(t_i*, r_i*)$ (i an element of $\{1,2\}$) is the (transmitter number, receiver number) pair used in a stand-alone $SHI_i$ for communication between $s_i$ and $d_i$.

With the construction discussed above, transmitter output $t_1*t_2*$ of SS $s_1*s_2*$ is connected to the $SDM_2$ (left side of FIG. 5) denoted $(sl*t_1*)$. Because this is a normal (and thus correct) implementation of $SDM_2$, the outputs of $SDM_2$ that are reached by this transmitter output include $(d_2*, r_2*)$. Combined with the designation of $SDM_2$, this output is then marked $(s_1*, t_1*, d_2*, r_2*)$.

Next consider the $SDM_1$ on the right-hand side of FIG. 5. Receiver input $r_1*r_2*$ of DS $d_1*d_2*$ is connected to the $SDM_1$ labelled $(d_2*, r_2*)$. Because this is a normal use of the $SDM_1$ in a $SHI_1$, the inputs of this $SDM_1$ from which this receiver input can be reached include $(s_1*, d_1*)$. Combined with the designation of a $SDM_1$, this input is then labelled $(d_2*, r_2*, s_1*, t_1*)$. But this input of the $SDM_1$ is connected to the $(s_1*, t_1*, d_2*, r_2*)$ output of the $SDM_2$, so there is indeed a path between the appropriate transmitter output and receiver input of the $s*$ and $d*$. Thus, all (transmitter, receiver) pairs are connected by at least one path.

Having now proven that the interconnection discussed above in connection with FIG. 5 provides the necessary path between SS and DS, it remains to be shown that there are not more than one path between any (s,d) pairs. This proof follows from the fact that each input of the $SDM_2$ reaches $(n_2/a_2)$ outputs and each input of the $SDM_1$ reaches exactly $(n_1/a_1)$ outputs. Therefore, concatenating the two SDMs makes it possible for each transmitter output to reach at most $n_1n_2/(a_1a_2)$ receiver inputs, which is exactly the number called for by the wiring matrix W specified in the above-cited Birk et al (1990) reference. Because all the required connections exit, it follows that there are no extra undesired connections.

The interconnection composition method discussed above in connection with FIG. 5 can be implemented with equal facility with $SDM_1$ and $SDM_2$ reversed. The resulting $SHI_3$ provides the same interstation connections but may have a different power split ratio and coupler count.

Although the new $SHI_3$ (FIG. 6) is now complete and offers message signal concurrency $k_3=6$ from six SSs each having four transmitter outputs to 32 DSs each having a single input, examination of the coupling stages shown in FIG. 6 reveals a new problem. Note that the cumulative fan-in and cumulative fan-out in FIG. 6 are both eight to one. Note also that the power split loss factor is 32, which is four times max (cumulative fan-in, cumulative fan-out). Examination of the SHIs illustrated in FIGS. 1-3 demonstrates that an "efficient" implementation should provide a power split loss of less than half that noted for $SHI_3$ in FIG. 6. Indeed, the power split loss of $SHI_3$ can be significantly reduced by the second coupling stage compaction step of this invention.

The Compaction Step of this Invention

The second compaction step is necessary to balance each of the coupling stages so that the in-degree is as close as possible to the out-degree for every coupler. The method for compacting these stages takes advantage of two unexpected and beneficial observations made by the inventor.

First, it is observed that a (x by y) coupler is equivalent to z couplers of size $(x_i$ by y) feeding y couplers of size (z by 1), with i an element of $\{1,2,\ldots,z\}$ and with the sum of all $x_i = x$, connected such that the inputs to the original coupler are partitioned among the inputs of the $(x_i$ by y) couplers with each (z by 1) coupler receiving one output from every $(x_i$ by y) coupler.

Secondly, it was unexpectedly and beneficially observed by the inventor that a (y by 1) coupler whose output feeds into a second coupler can be eliminated by increasing the number of inputs of the second coupler by $(y-1)$ and feeding the (y by 1) coupler inputs directly to the second coupler inputs.

A useful consequence of these observations is that the coupler in-degree in any given coupling stage can be reduced upon an appropriate increase of the coupler in-degree in the next coupling stage, provided that the number of couplers in the early coupling stage is also increased. Similarly, it is possible to reduce the out-degree of couplers in a given coupling stage by appropriately increasing the out-degree of those couplers in a previous coupling stage, provided that the number of couplers in the later stage is also increased. This is not an obvious consequence of the above observations because the same rules do not work in the opposite direction, that is, they are not symmetric. The actual changes in connection and coupler structures are readily deduced from the necessary input and output links.

Another useful consequence is that whenever a coupling stage is replaced with new couplers of identical size, the necessary in-degree and out-degree of the new couplers can be determined simply by dividing the in-degree of the original couplers in one coupling stage by some integer factor (z) and then multiplying the in-degree of the couplers in the next coupling stage by the same factor of (z). A special case of this mechanism permits the simple swapping of coupler in-degrees in successive coupling stages provided that the in-degree is reduced in the earlier coupling stage. Similarly, coupler out-degrees can be swapped in successive stages provided that the out-degree is increased in the earlier coupling stage. Finally, note that the coupling stages involved in a compacting transformation need not be adjacent provided that the in-degree of the earlier stage is reduced or the out-degree of the earlier stage is increased because there is always an equivalent sequence of proper transformations between the degrees of adjacent coupling stages.

The compaction step of the method of this invention consists of successive application of these transformation rules with (z) factors that are chosen appropriately by inspection of the problem until optimal coupling stage balance is attained. The associated rearrangement of connections can be easily deduced from the coupling stage transformations. These compaction procedures always improve the power spreading loss in two specific situations.

The first of these exists when a coupling stage 62 has out-degree one and an adjacent later stage 64 has in-degree one, as shown in FIG. 6. Compaction allows the replacement of stage 64 with (1 by 1) couplers that are then removed, effectively merging the stage with stage 62.

The second situation is where one of the component SDMs has a larger compound fan-in than fan-out and the other component SDM has the reverse situation. In such case, the composition step should be carried out with the excess compound fan-in assigned to $SDM_2$ at the early stages of the new $SHI_3$ and the later stages reserved to that SDM having the excess fan-out. With such composition, the compaction process can be used for balancing because the excess fan-in can be pushed to the right where it is available to cancel the excess fan-out. The reverse is not similarly easy.

Figure 7:
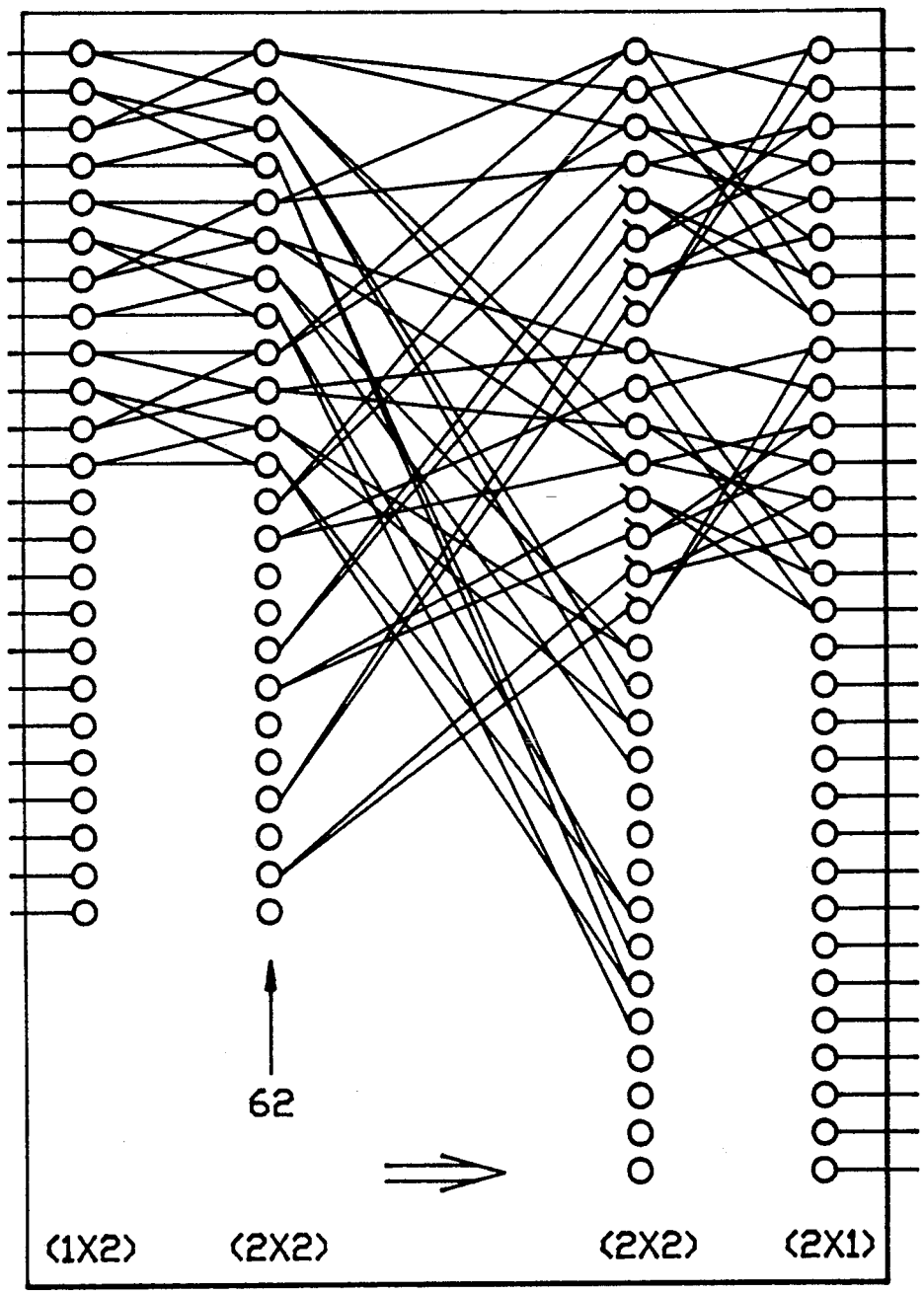
FIG. 7 shows the four coupling stages of the (4,1;6,32) SDM from the SHI of FIG. 5 after the compaction step of the method of this invention.

The first of these two advantageous situations is illustrated in FIGS. 6 and 7. Note that the second coupling stage 62 in FIG. 6 contains 24 (2 by 1) couplers and the third coupling stage 64 contains 24 (1 by 2) couplers. Using the rules discussed above, the coupling stage 62 couplers can be replaced with couplers having their out-degree increased by a factor $z=2$ provided that the coupling stage 64 couplers are also replaced by couplers with their out-degree reduced by the same factor $z=2$. This can be written symbolically as replacing the two adjacent coupling stages [(2 by 1)(1 by 2)] with the two new coupling stages [(2 by 2)(1 by 1)]. Of course, the (1 by 1) couplers are trivial and can be eliminated. The results of this transformation and elimination of coupling stage 64 is illustrated in FIG. 7.

The simple compacting transformation discussed above in connection with FIG. 6 results in cutting the power split loss from 32 to 16 without any effect on channel concurrency or transmission scheduling. The $SHI_3$ in FIG. 7 represents the "efficient" implementation of (4,1; 6,32), which is not available from the earlier composition step of the method of this invention alone. That is, even though the component $SDM_1s$ and $SDM_2s$ are "efficient" implementations, the new $SHI_3$ combining a plurality of $SDM_1s$ and $SDM_2s$ will not be "efficient" merely as a result of wiring everything together according to the "natural" connection scheme. The second coupling stage compaction step of the method of this invention is necessary to ensure an efficient $SHI_3$ design.

The example discussed above in connection with FIGS. 5-7 illustrates a $SHI_3$ having only one receiver input per DS. The following examples demonstrate that the method of this invention applies equally well to the general case of $(b_3)$ inputs per DS.

COUPLING STAGE COMPACTION EXAMPLE 1

Consider the constituent interconnections $SDM_1=(2,1; k,2^k)$ and the transpose $SDM_2$ $(1,2; 2^k,k)$. In the above-cited Birk patent, it was shown the the coupling stages for an optimal implementation of $SDM_1$ are:

(1 by $2^{k/2-1}$),(k/2 by $2^{k/2}$),(2 by 1).

By symmetry, the optimal stages for $SDM_2$ are:

(1 by 2),($2^{k/2}$ by k/2),($2^{k/2-1}$ by 1).

Clearly, $SDM_1$ has excess cumulative fan-out $(2^{k-1}>k)$ and $SDM_2$ has excess fan-in $(k<2^{k-1})$.

Composition results in an interconnection whose coupler sizes in the various stages are:

(1 by 2),($2^{k/2}$ by k/2),($2^{k/2-1}$ by 1),(1 by $2^{k/2-1}$), (k/2 by $2^{k/2}$),(2 by 1).

Without compaction, the power split of this interconnection would be $(2*2^{k/2}*2^{k/2-1})^2 = 2^{2k}$. Since $m=n=k2^k$, the power split is roughly $(n/\log_2 n)^2$.

The compaction is started by merging the last coupler in the first half of the path with the first one in the second, resulting in (1 by 2),($2^{k/2}$ by k/2),($2^{k/2-1}$ by $2^{k/2-1}$),(k/2 by $2^{k/2}$), (2 by 1).

Next, the in-degree of stage-3 couplers is reduced by a factor of $((2^{k/2})/k)$ and the in-degree of stage-4 couplers is increased by that same factor. Similarly, the out-degree of stage-3 couplers is reduced by that factor and the out-degree of stage-2 couplers increased by it. The result:

(1 by 2),($2^{k/2}$ by $2^{k/2-1}$),(k/2 by k/2),($2^{k/2-1}$ by $2^{k/2}$), (2 by 1).

Finally, the in-degree of stage-2 couplers and the out-degree of stage-4 couplers are reduced by a factor of 2 and the in-degree and out-degree of stage-3 couplers are doubled. The result:

(1 by 2),($2^{k/1-1}$ by $2^{k/1-1}$),(k by k),($2^{k/1-1}$ by $2^{k/2-1}$), (2 by 1).

The power split here is $k*2^k = n$. Half of this value may be thought possible because each transmitter only reaches n/2 receivers. However, it is impossible because it would require that the last-stage couplers have out-degree greater than one, requiring two receivers that hear identical sets of transmitters. There are no such receivers in the required wiring. Thus, the above result is truly the power-optimal wiring for the $(2,2; k2^k, k2^k)$ interconnection.

COUPLING STAGE COMPACTION EXAMPLE 2

Consider the constituent interconnections $(2,1; k, 2^k)$ and $(1,1; 2^k/k, 1)$. Combining these equalizes the number of source and destination stations while still using two transmitters and one receiver per station. This is commonly desired in networks where a single station is both a DS and a SS.

The above-cited Birk patent showed that the coupler sizes for an optimal implementation of the first interconnection are (1 by $2^{k/2-1}$),(k/2 by $2^{k/2}$),(2 by 1).

The second one is trivially implemented using a ($2^{k/k}$ by 1) coupler.

Noting that the first interconnection has excess cumulative fan-out while the second one has excess fan-in, the second one is placed in the first part of the path, giving:

($2^{k/k}$ by 1),(1 by $2^{k/2-1}$),(k/2 by $2^{k/2}$),(2 by 1).

The power split here is $2^{2k}/k$. Since $n=2^k$, the power split is roughly $n^2/\log_2 n$.

Combining the last coupler of the first part with the first of the second part obtains:

($2^k/k$ by $2^{k/2-1}$),(k/2 by $2^{k/2}$),(2 by 1).

Here, the power split is $2^{1.5k+1}/k$.

Reducing the in-degree of stage-1 couplers by a factor of $2^{k/2}/(k/2)$ and increasing the in-degree of stage-3 couplers by the same factor yields:

($2^{k/2-1}$ by $2^{k/2-1}$),($2^{k/2}$ by $2^{k/2}$),(2 by 1).

Here, the power split is $2^k=n$, which is optimal.

In the above examples, the coupler in-degrees and out-degrees are manipulated without addressing the actual connections that must be made. However, these connections are obvious from the transformations especially if tracked from transformation to transformation.

It is a feature of this invention that, while fiber-optics provide a natural method for implementing these interconnections, they can be also implemented using other media and devices that enforce directional signal propagation, such as waveguides. If the efficient SHI of this invention is implemented using wires, couplers equivalent to directional star couplers may be implemented using a number of logic gates disposed such that the idle value of the propagated signal is consistent with the gate logic. For example, if an OR gate is used, the idle signal value must be "zero". Alternatively, diodes may be used instead of gates.

It is another feature of this invention that the SHI may be used to carry analog as well as digital signal traffic.

A simple extension of these teachings is the use of an additional form of signal separation, such as wavelength, resulting in multiple SHIs each constructed according to these teachings.

It is also an obvious extension of these teachings to apply the coupling stage compaction methods to a switch interconnection having switches in place of the couplers described above. In such a switch interconnection, each switch has one or more inputs and one or more outputs. By applying one or more of the above-described compaction steps, the number of switches in an inefficient interconnection can be reduced and perhaps the number of switching stages may also be reduced. The power spreading loss problem is not an issue in a switch interconnection of this type but the resulting reduction in component count is an advantageous feature of the application of this invention to such switched networks.

Clearly, other embodiments and modifications of this invention will occur readily to those of ordinary skill in the art in view of these teachings. Therefore, this invention is to be limited only by the claims, which include all such embodiments and modifications when viewed in conjunction with the above specification and accompanying drawing.

I claim:

1. A method for interconnecting $m_1$ groups of $m_2$ first Source Stations (SSs) each said first SS having at least $a_1$ groups of $a_2$ outputs for transmitting message signals to $n^2$ groups of $n_1$ first Destination Stations (DSs) each said first DS having at least $b_2$ groups of $b_1$ inputs for receiving said message signals, such that each said first SS is uniquely connected to every said first DS by a single-hop directional connection whereby up to $k_3$ concurrent non-interfering message signal transmissions can be scheduled from said $m_2*m_1 = m_3$ first SSs to said $n_2*n_1 = n_3$ first DSs, wherein $k_3 = k_1*k_2$, $n_i > k_i$ and $m_i > k_i$, and wherein $k_i$, $m_i$, $n_i$, $a_i$ and $b_i$ are positive non-zero integers for i=1, 2 or 3, said method comprising the steps of:

(a) composing said interconnection of said first SSs and said first DSs by performing the steps of (a.1) abutting a first plurality of first Shared Directional Multichannels (SDMs) to a second plurality of second SDMs, each said first SDM having a first plurality of coupling stages each having one or more couplers, said each first SDM having capacity for scheduled uniform message signal traffic of up to $k_1$ concurrent signals from $m_1$ second SSs, each said second SS having at least $a_1$ outputs for transmitting said signals to $n_1$ second DSs, each said second DS having at least $b_1$ inputs for receiving said signals, each said second SDM having a second plurality of coupling stages each having one or more couplers, said each second SDM having capacity for scheduled uniform message signal traffic of up to $k_2$ concurrent signals from $m_2$ third SSs, each said third SS having at least $a_2$ outputs for transmitting said signals to $n_2$ third DSs, each said third DS having at least $b_2$ inputs for receiving said signals, wherein said first plurality of first SDMs is at least ($n_2*b_2$) in number and said second plurality of second SDMs is at least ($m_1*a_1$) in number, (a.2) assigning a second SDM index to every said second SDM in said second plurality according to the concatenation ($s_1$, $t_1$) of an index $s_1 \leq m_1$ for one said first SS group and an index $t_1 \leq a_1$ for one said first SS output group, where $s_1$ and $t_1$ are positive non-zero integers and said second SDM index is the concatenation ($s_1,t_1$), (a.3) assigning a second output index to every output of each said second SDM having said second SDM index ($s_1$, $t_1$) according to the concatenation ($d_2$, $r_2$) of an index $d_2 < n_2$ for one said third DS and an index $r_2 < b_2$ for one said third DS input, where $d_2$ and $r_2$ are positive non-zero integers and said second output index is the concatenation ($s_1$, $t_1$, $d_2$, $r_2$), (a.4) assigning a first SDM index to every said first SDM in said first plurality according to the concatenation ($d_2$, $r_2$) of an index $d_2 \leq n_2$ for one said first DS group and an index $r_2 \leq b_2$ for one said first DS input group, where $d_2$ and $r_2$ are positive non-zero integers and said first SDM index is the concatenation ($d_2,r_2$), (a.5) assigning a first input index to every input of each first SDM having said first SDM index ($d_2$, $r_2$) according to the concatenation ($s_1$, $t_1$) of an index $s_1 \leq m_1$ for one said second SS and an index $t_1 \leq a_1$ for one said second SS output, where $s_1$ and $t_1$ are positive non-zero integers and said first input index is the concatenation ($s_1$, $t_1$, $d_2$, $d_2$), and (a.6) connecting each said output from said second plurality of second SDMs having a second output index ($s_1,t_1,d_2,r_2$) to all said inputs of said first plurality of first SDMs having said first input index ($s_1$, $t_1$, $d_2$, $r_2$).

2. The method of claim 1 further comprising the steps of:

(b) replacing said first and said second pluralities of coupling stages with fewer coupling stages each having one or more new couplers; and (c) connecting the inputs and outputs of said new couplers such that each said first SS is connected to every said first DS in accordance with the connections made in said composing step (a), thereby compacting said interconnection of said first SSs and said first DSs to reduce spreading loss and component count.

3. The method of claim 2 further comprising the step of:

(d) connecting said second SDM inputs to said first SS outputs such that said second SDM index ($s_1$, $t_1$) is identical to the concatenation of the index $s_1 \leq m_1$ for the corresponding said first SS group number and the index $t_1 \leq a_1$ for the corresponding said first SS output group number.

4. The method of claim 3 further comprising the step of:

(e) connecting said first SDM outputs to said first DS inputs such that said first SDM index ($d_2$, $r_2$) is identical to the concatenation of the index $d_2 \leq n_2$ for the corresponding said first DS group number and the index $r_2 \leq b_2$ for the corresponding said first DS input group number.

5. The method of claim 4 wherein:
said second SDM has no excess cumulative fan-out and said first SDM has no excess cumulative fan-in.

6. The method of claim 2 wherein $a_1 = b_2 = 2$ and $b_1 = a_2 = 1$.

7. The method of claim 1 wherein:
said first, second and third pluralities of coupling stages include optical star couplers; and
said interconnection includes means for conducting optical signals.

8. The method in claim 7 wherein:
said optical star couplers include a plurality of smaller optical star couplers interconnected to form larger optical star couplers.

9. The method of claim 1 further comprising the step of:

(d) connecting said second SDM inputs to said first SS outputs such that said second SDM index ($s_1$, $t_1$) is identical to the concatenation of the index $s_1 \leq m_1$ for the corresponding said first SS group number and the index $t_1 \leq a_1$ for the corresponding said first SS output group number.

10. The method of claim 1 further comprising the step of:

(e) connecting said first SDM outputs to said first DS inputs such that said first SDM index ($d_2$, $r_2$) is identical to the concatenation of the index $d_2 \leq n_2$ for the corresponding said first DS group number and the index $r_2 \leq b_2$ for the corresponding said first DS input group number.

11. The method of claim 1 wherein:
said second SDM has no excess cumulative fan-out and said first SDM has no excess cumulative fan-in.

12. A method for reducing the power spreading loss in a passive interconnection of $m_1$ groups of $m_2$ first SSs, each said first SS having at least $a_1$ groups of $a_2$ outputs for transmitting up to $k_3$ concurrent non-interfering message signals to $n_2$ groups of $n_1$ first DSs, each said first DS having at least $b_2$ groups of $b_1$ inputs for receiving said message signals, said passive interconnection having a first plurality of first SDMs and a second plurality of second SDMs, each said first SDM having $c_1$ coupling stages and a uniform scheduled concurrent non-interfering message signal capacity of $k_1$, each said second SDM having $c_2$ coupling stages and a uniform scheduled concurrent non-interfering message signal capacity of $k_2$, each said coupling stage having one or more couplers, where $k_3 = k_1*k_2$ and $k_1$, $k_2$, $c_1$ and $c_2$ are all positive non-zero integers, said method comprising the steps of:

(a) replacing said ($c_1+c_2$) coupling stages with $c_3 \leq (c_1+c_2)$ new coupling stages, each said new coupling stage having a plurality of substantially balanced couplers; and (b) connecting the inputs and outputs of said new coupling stages such that each said first SS is connected to every said first DS in accordance with the connections made by said passive interconnection, thereby compacting said passive interconnection of said first SSs and said first DSs to reduce power spreading loss and component count.

13. The method of claim 12 wherein said replacing step (a) comprises the steps of:
increasing the out-degree of each said coupler in a first said coupling stage by a first factor;
decreasing the out-degree of each said coupler in a second said coupling stage by said first factor; and
increasing the number of said couplers in said second coupling stage, where said second coupling stage is disposed on the output side of said first coupling stage.

14. The method of claim 13 wherein said replacing step (a) comprises the steps of:
  decreasing the in-degree of each said coupler in a third said coupling stage by a second factor;
  increasing the in-degree of each said coupler in a fourth said coupling stage by said second factor; and
  increasing the number of said couplers in said third coupling stage, where said third coupling stage is disposed on the input side of said fourth coupling stage.

15. The method of claim 12 wherein said replacing step (a) comprises the steps of:
  decreasing the in-degree of each said coupler in a first said coupling stage by a first factor;
  increasing the in-degree of each said coupler in a second said coupling stage by said first factor; and
  increasing the number of said couplers in said first coupling stage, where said first coupling stage is disposed on the input side of said second coupling stage.

16. The method of claim 12 wherein:
  said ($c_1 + c_2$) coupling stages include optical star couplers; and
  said passive interconnection includes means for conducting optical signals.

17. The method of claim 12 wherein said replacing step (a) further comprises the step of:
  replacing a pair of two adjacent said coupling stages with a single coupling stage, where each said coupler in one said adjacent coupling stage is connected to no more than one said coupler in the other said adjacent coupling stage.

18. A shared directional multichannel system for scheduled uniformed message signal traffic of up to (k) concurrent non-interfering message signal transmissions, wherein k, m, n, a, b and c are positive non-zero integers, $c = \lceil \log_a n \rceil$, and $m \geq k \geq (c \text{ choose } (a-1)) = c!/(a-1)!/(c-a+1)!$, said system comprising:
  a first plurality of source stations (SSs), each said SS including a second plurality (a) of transmitter outputs, wherein said first plurality is less than or equal to (m);
  a third plurality (n) of destination stations (DSs), each said DS including a fourth plurality (b) of receiver inputs; and
  interconnection means for passively coupling signals from each said SS to every said DS such that the power received at each said receiver input is greater than $a/n^2$ times the power transmitted from said transmitter outputs connected to said each receiver input.

19. The shared directional multichannel system of claim 18 wherein:
  said power received at said each receiver input is greater than $(a/n/\log_a n)$ times the power transmitted from said transmitter outputs connected to said each receiver input.

20. The shared directional multichannel system of claim 19 wherein said interconnection means comprises:
  a plurality of optical star couplers disposed to transfer optical signal transmissions forming said scheduled uniform message signal traffic.

21. The shared directional multichannel system of claim 18 wherein said interconnection means comprises:
  a plurality of optical star couplers disposed to transfer optical signal transmissions forming said scheduled uniform message signal traffic.

22. A method for reducing the power spreading loss in a passive interconnection of $m_1$ groups of $m_2$ first SSs, each said first SS having at least $a_1$ groups of $a_2$ outputs for transmitting up to $k_3$ concurrent non-interfering message signals to $n_2$ groups of $n_1$ first DSs, each said first DS having at least $b_2$ groups of $b_1$ inputs for receiving said message signals, said passive interconnection having a first plurality of first SDMs and a second plurality of second SDMs, each said first SDM having $c_1$ coupling stages and a uniform scheduled concurrent non-interfering message signal capacity of $k_1$, each said second SDM having $c_2$ coupling stages and a uniform scheduled concurrent non-interfering message signal capacity of $k_2$, each said coupling stage having one or more couplers, where $k_3 = k_1 * k_2$ and $k_1$, $k_2$, $c_1$ and $c_2$ are all positive non-zero integers, said method comprising the steps of:
  (a) evaluating the coupler fan-in and fan-out within each of said ($c_1 + c_2$) coupling stages to determine where said coupler fan-in and fan-out must be changed to make said coupler fan-in substantially equal to said coupler fan-out in said each coupling stage;
  (b) responsive to the results of said evaluating step, performing at least one of the following (b.1), (b.2) or (b.3) replacing steps of:
    (b.1) replacing one or more said coupling stages with one or more first new coupling stages, said first new coupling stages each having a plurality of first new couplers specified in accordance with the steps of
      (b.1.1) increasing the out-degree of each said coupler in a first said coupling stage by a first factor,
      (b.1.2) decreasing the out-degree of each said coupler in a second said coupling stage by said first factor, and
      (b.1.3) increasing the number of said couplers in said second coupling stage, where said second coupling stage is disposed on the output side of said first coupling stage,
    (b.2) replacing one or more said coupling stages with one or more second new coupling stages, said second new coupling stages each having a plurality of second new couplers specified in accordance with the steps of
      (b.2.1) decreasing the in-degree of each said coupler in a third said coupling stage by a second factor
      (b.2.2) increasing the in-degree of each said coupler in a fourth said coupling stage by said second factor, and
      (b.2.3) increasing the number of said couplers in said third coupling stage, where said third coupling stage is disposed on the input side of said fourth coupling stage, and
    (b.3) replacing a pair of two adjacent said coupling stages with a single coupling stage having a plurality of couplers with in-degree and out-degree specified in accordance with the coupler in-degree for one said adjacent coupling stage and the coupler out-degree for the other said adjacent coupling stage, where each said coupler in said one adjacent coupling stage is connected to no more than one said coupler in said other adjacent coupling stage; and
  (c) repeating said evaluating step (a) and said replacing step (b) successively until said coupler in-degree and out-degree are substantially balanced in each remaining said coupling stage.

23. A method for reducing the power spreading loss in a passive interconnection for transmitting a plurality of concurrent non-interfering message signals from a set of Source Stations (SSs) to a set of Destination Stations (DSs), said passive interconnection having a first plurality of coupling stages each having one or more couplers, each said coupler having one or more inputs and one or more outputs, wherein said coupler inputs of the $i^{th}$ said coupling stage are connected passively to said coupler outputs of the (i−1)th said coupling stage and said coupler outputs of said $i^{th}$ coupling stage are connected passively to said coupler inputs of the (i+1)th said coupling stage, where i<j are non-zero positive integers less than or equal to said first plurality, said method comprising the steps of:
 (a) replacing said first plurality of coupling stages with a second plurality of new coupling stages, said second plurality being less than or equal to said first plurality, each said new coupling stage having a plurality of substantially balanced couplers; and
 (b) connecting said inputs and said outputs of each said new coupling stage such that said set of SSs is interconnected with said set of DSs in accordance with said passive interconnection, thereby compacting said passive interconnection of said set of SSs and said set of DSs to reduce power spreading loss and component count.

24. The method of claim 23 wherein said replacing step (a) comprises the steps of:
 increasing the out-degree of each said coupler in said $i^{th}$ coupling stage by a first factor;
 decreasing the out-degree of each said coupler in said $j^{th}$ coupling stage by said first factor; and
 increasing the number of said couplers in said $j^{th}$ coupling stage.

25. The method of claim 24 wherein said replacing step (a) comprises the steps of:
 decreasing the in-degree of each said coupler in said $i^{th}$ coupling stage by a second factor;
 increasing the in-degree of each said coupler in said $j^{th}$ coupling stage by said second factor; and
 increasing the number of said couplers in said $i^{th}$ coupling stage.

26. The method of claim 23 wherein said replacing step (a) comprises the steps of:
 decreasing the in-degree of each said coupler in said $i^{th}$ coupling stage by a first factor;
 increasing the in-degree of each said coupler in said $j^{th}$ coupling stage by said first factor; and
 increasing the number of said couplers in said $i^{th}$ coupling stage.

27. The method of claim 23 wherein:
 said plurality of coupling stages includes optical star couplers; and
 said passive interconnection includes means for conducting optical signals.

28. The method of claim 23 wherein said replacing step (a) further comprises the step of:
 replacing a pair of two adjacent said coupling stages with a single coupling stage, where each said coupler in one said adjacent coupling stage is connected to no more than one said coupler in the other said adjacent coupling stage.

29. A method for reducing the power spreading loss in a passive interconnection for transmitting a plurality of concurrent non-interfering message signals from a set of Source Stations (SSs) to a set of Destination Stations (DSs), said passive interconnection having a first plurality of coupling stages each having one or more couplers, each said coupler having one or more inputs and one or more outputs, wherein said coupler inputs of the $i^{th}$ said coupling stage are connected passively to said coupler outputs of the (i−1)th said coupling stage and said coupler outputs of said $i^{th}$ coupling stage are connected passively to said coupler inputs of the (i+1)th said coupling stage, where i<j are non-zero positive integers less than or equal to said first plurality, said method comprising the steps of:
 (a) evaluating the coupler fan-in and fan-out within each of said first plurality of coupling stages to determine where said coupler fan-in and fan-out must be changed to make said coupler fan-in substantially equal to said coupler fan-out in said each coupling stage;
 (b) responsive to the results of said evaluating step, performing at least one of the following (b.1), (b.2) or (b.3) replacing steps of:
  (b.1) replacing one or more said coupling stages with one or more first new coupling stages, said first new coupling stages each having a plurality of first new couplers specified in accordance with the steps of
   (b.1.1) increasing the out-degree of each said coupler in said $i^{th}$ coupling stage by a first factor,
   (b.1.2) decreasing the out-degree of each said coupler in said $j^{th}$ coupling stage by said first factor, and
   (b.1.3) increasing the number of said couplers in said $j^{th}$ coupling stage,
  (b.2) replacing one or more said coupling stages with one or more second new coupling stages, said second new coupling stages each having a plurality of second new couplers specified in accordance with the steps of
   (b.2.1) decreasing the in-degree of each said coupler in said $i^{th}$ coupling stage by a second factor
   (b.2.2) increasing the in-degree of each said coupler in said $j^{th}$ coupling stage by said second factor, and
   (b.2.3) increasing the number of said couplers in said $i^{th}$ coupling stage, and
  (b.3) replacing a pair of two adjacent said coupling stages with a single coupling stage having a plurality of couplers with in-degree and out-degree specified in accordance with the coupler in-degree for one said adjacent coupling stage and the coupler out-degree for the other said adjacent coupling stage, where each said coupler in said one adjacent coupling stage is connected to no more than one said coupler in said other adjacent coupling stage; and
 (c) repeating said evaluating step (a) and said replacing step (b) successively until said coupler in-degree and out-degree are substantially balanced in each remaining said coupling stage.

30. A method for reducing the number of switching elements in a switched interconnection for transmitting a plurality of non-interfering message signals from a set of Source Stations (SSs) to a set of Destination Stations (DSs), said switched interconnection having a first plurality of switching stages each having one or more switches, each said switch having one or more inputs and one or more outputs, wherein the inputs of the $i^{th}$ said switching stage are connected passively to the outputs of $(i-1)$th said switching stage and the outputs of said $i^{th}$ switching stage are connected passively to the inputs of the $(i+1)$th said switching stage, where $i<j$ are non-zero positive integers less than or equal to said first plurality, said method comprising the steps of:

(a) replacing said first plurality of switching stages with a second plurality of new switching stages, said second plurality being less than or equal to said first plurality, each said new switching stage having a plurality of substantially balanced switches; and (b) connecting said inputs and said outputs of each said new switching stage such that said set of SSs is interconnected with said set of DSs in accordance with said passive interconnection, thereby compacting said passive interconnection of said set of SSs and said set of DSs to reduce component count.

31. The method of claim 30 wherein said replacing step (a) comprises the steps of:
increasing the out-degree of each said switch in said $i^{th}$ switching stage by first factor;
decreasing the out-degree of each said switch in said $j^{th}$ switching stage by said first factor;
increasing the number of said switches in said $j^{th}$ switching stage.

32. The method of claim 31 wherein said replacing step (a) comprises the steps of:
decreasing the in-degree of each said switch in said $i^{th}$ switching stage by a second factor;
increasing the in-degree of each said switch in said $j^{th}$ switching stage by said second factor; and
increasing the number of said switches in said $i^{th}$ switching stage.

33. The method of claim 30 wherein said replacing step (a) comprises the steps of:
decreasing the in-degree of each said switch in said $i^{th}$ switching stage by a first factor;
increasing the in-degree of each said switch in said $j^{th}$ switching stage by said first factor; and
increasing the number of said switches in said $i^{th}$ switching stage.

34. The method of claim 30 wherein:
said plurality of switching stages includes optical switches; and
said passive interconnection includes means for conducting optical signals.

35. The method of claim 30 wherein said replacing step (a) further comprises the step of:
replacing a pair of two adjacent said switching stages with a single switching stage, where each said switch in one said adjacent switching stage is connected to no more than one switch in the other said adjacent switching stage.

36. A method for reducing the number of switching elements in a switched interconnection for transmitting a plurality of non-interfering message signals from a set of Source Stations (SSs) to a set of Destination Stations (DSs), said switched interconnection having a first plurality of switching stages each having one or more switches, each said switch having one or more inputs and one or more outputs, wherein the inputs of the $i^{th}$ said switching stage are connected passively to the outputs of $(i-1)$th said switching stage and the outputs of said $i^{th}$ switching stage are connected passively to the inputs of the $(i+1)$th said switching stage, where $i<j$ are non-zero positive integers less than or equal to said first plurality, said method comprising the steps of:

(a) evaluating the switch fan-in and fan-out within each said switching stage to determine which of said switch fan-in and fan-out must be increased to make said switch fan-in substantially equal to said switch fan-out for said each switching stage;

(b) responsive to the results of said evaluating step, performing at least one of the following (b.1), (b.2) or (b.3) replacing steps of:

(b.1) replacing one or more said switching stages with one or more first new switching stages, said first new switching stages each having a plurality of switches specified in accordance with the steps of
(b.1.1) increasing the out-degree of each said switch in said $i^{th}$ switching stage by a first factor,
(b.1.2) decreasing the out-degree of each said switch in said $j^{th}$ switching stage by said first factor, and
(b.1.3) increasing the number of said switches in said $j^{th}$ switching stage, (b.2) replacing one or more said switching stages with one or more second new switching stages, said second new switching stages each having a plurality of switches specified in accordance with the steps of
(b.2.1) decreasing the in-degree of each said switch in said $i^{th}$ switching stage by a second factor,
(b.2.2) increasing the in-degree of each said switch in said $j^{th}$ switching stage by said second factor, and
(b.2.3) increasing the number of said switches in said $i^{th}$ switching stage, and (b.3) replacing a pair of two adjacent said switching stages with a single switching stage having a plurality of switches with in-degree and out-degree specified in accordance with the switch in-degree for one said adjacent switching stage and the switch out-degree for the other said adjacent switching stage, where each said switch in said one adjacent switching stage is connected to no more than one said switch in said other adjacent switching stage; and (c) repeating said evaluating step (a) and said replacing step (b) successively until said switch in-degree and out-degree are substantially balanced in each remaining said switching stage.

* * * * *